United States Patent Office 3,262,183
Patented July 26, 1966

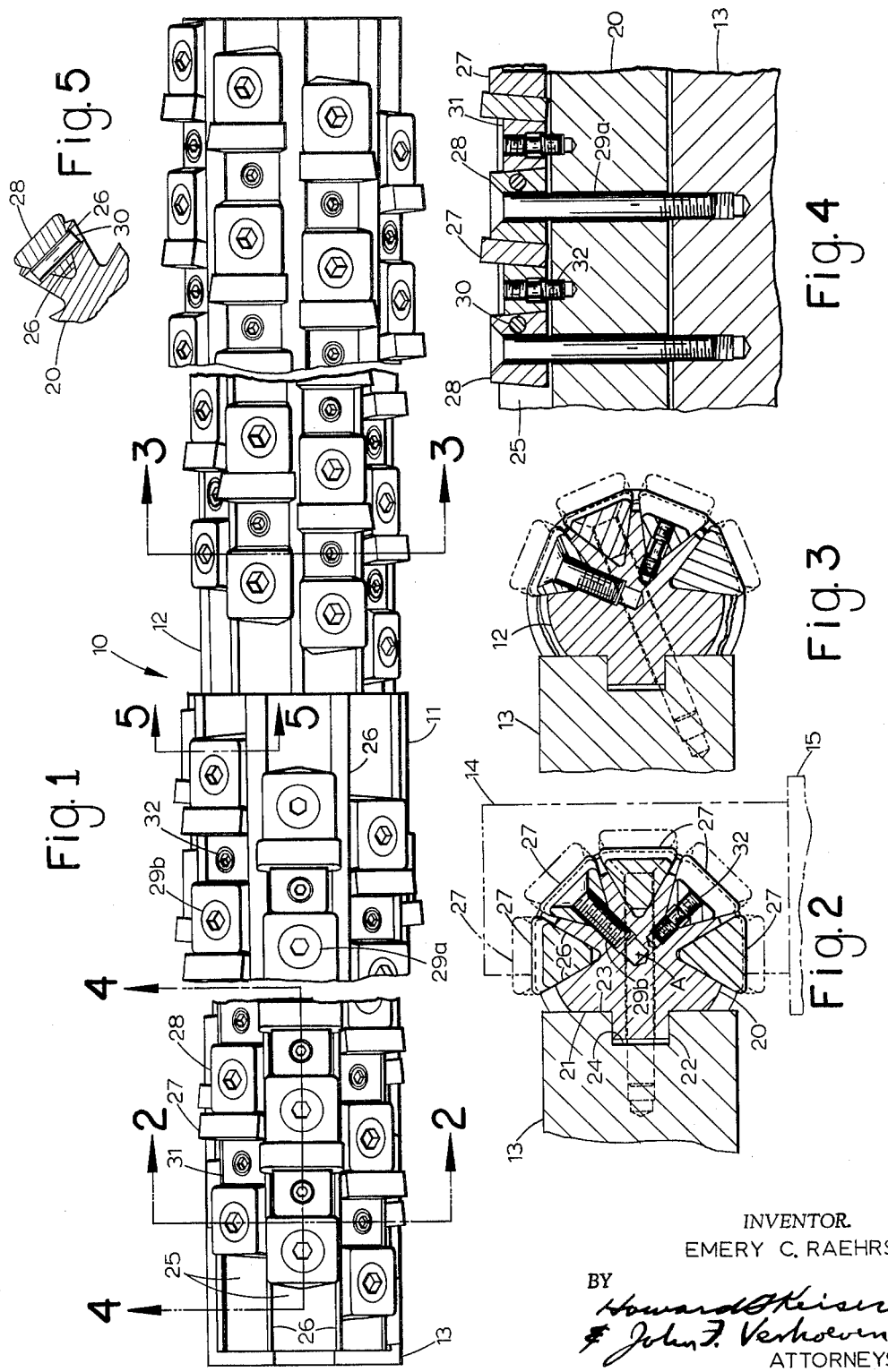

3,262,183
BROACHING TOOL
Emery C. Raehrs, Cincinnati, Ohio, assignor to The Cincinnati Milling Machine Co., Cincinnati, Ohio, a corporation of Ohio
Filed Sept. 25, 1964, Ser. No. 399,268
8 Claims. (Cl. 29—95.1)

The present invention relates to a broaching tool and, more specifically, to a broaching tool which utilizes replaceable cutting bits.

Replaceable cutting bits are sometimes used in broaching tools and, generally, each has several cutting edges. The bit is clamped in the bit holder with only one edge in an effective cutting position. When that edge becomes dull, the bit can be repositioned with another edge in cutting position. After all the edges have become dull, the bit is replaced with a sharp bit. A seat must be provided for each bit and the usual bit holder is difficult and costly to fabricate.

In the present invention, a broaching tool is provided with a bit holder which is of simple and inexpensive construction but which, nevertheless, is effective in holding the individual bits in proper positions for cutting. In the preferred form of the inveniton, a broaching tool for semi-circular cuts is provided with a substantially semi-cylindrical bit holder having a plurality of straight longitudinal V-shaped grooves. A plurality of triangular bits (with six cutting edges) are received in spaced apart relation in each groove with the effective cutting edge extending above the bit holder. Triangular shaped backing members are received in the grooves, one behind each cutting bit. Rigidity and strength are assured by a pin extending through the backing member and into the walls on both sides of the groove. A wedge block received in front of each cutting bit (and directly behind the preceding backing member) clamps the bit against the backing member behind the bit.

It is therefore one object of the present invention to provide a broaching tool with a simple, inexpensive bit holder. It is another object of the present invention to provide a broaching tool in which each cutting bit is rigidly supported. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:
FIG. 1 is a side view of a broaching tool assembly comprising two broaching tools constructed in accordance with the present invention; and
FIGS. 2, 3, 4, and 5 are views taken on the lines 2—2, 3—3, 4—4, and 5—5, respectively of FIG. 1.

There is shown in FIG. 1 a broaching tool assembly, indicated generally at 10, comprising two broaching tools 11 and 12 in tandem relation. Both tools 11 and 12 are mounted on a base member 13 which is connected to a ram (not shown) of a broaching machine for movement thereby to the left as viewed in FIG. 1. The broaching tools are used in the illustrated embodiment of the invention to enlarge a semi-circular opening in workpiece 14 which is rigidly secured to a stationary bed 15.

The broaching tool 11 has a holder 20 which has a central axis A, and, although of slightly larger diameter at the rear than at the front, may be considered as of substantially semi-cylindrical conformation. The holder has a flat surface 21 with a longitudinally extending tongue 22. When the tool is mounted on the base member 13, the flat surface 21 of the holder is received on flat surface 23 of the base member, and the tongue 22 of the holder is received in groove 24 of the base member.

Holder 20 has a plurality of circumferentially spaced, straight, longitudinally extending, V-shaped grooves 25 which define sloping walls 26 in the holder. Each groove 25, because of the larger diameter at the rear of the holder, is closest to the central axis A at the front end of tool 11 (that is, the left end as viewed in FIG. 1) and extends further from the axis as it extends rearwardly (that is, to the right as viewed in FIG. 1). The grooves extend all the way through the holder as shown in FIG. 1.

Each groove 25 has a plurality of triangular bits 27 received therein. The apex of each bit fits into the apex, or bottom, of the groove and the side edges of the bit which extend outwardly from the apex seat on the walls of the groove. Since the grooves flare slightly outwardly as they extend rearwardly, each bit sits higher (with reference to axis A) than the preceding bit.

Behind each bit is a triangular backing member 28. As shown best in FIG. 4, each backing member 28 has a bolt 29a or 29b received therein. The bolts 29a, which are received in the backing members of the central, or one of the central, grooves only extend through the holder 20 and are threadedly received in base member 13. The bolts 29b, which are received in the backing members of the other grooves, are threadedly received in the holder 20. It will be noted that bolts 29a and 29b offer only cantilever support to each backing member 28 since one end of the bolts terminate in backing member 28. It is only the lower end of the bolt 29 which is gripped (in the holder 20 or base member 13). The rearwardly acting force (that is, the force acting to the right as viewed in FIGS. 1 and 4) on bits 27 due to the cut is sometimes very high and when this is so, extremely strong and rigid backing is required for each bit. Unusual strength is supplied to backing member 28 to resist the rearwardly acting cutting force on the bit supported by the backing member by a pin 30 received in each backing member. As shown best in FIG. 5, both ends of pin 30 are received in side walls 26 and extend into the holder on both sides of the groove for support thereby.

There are received in each groove 25 a plurality of clamping blocks 31, one directly in front of each bit 27. It will be noted from FIG. 4 that each backing member 28 has a front and rear face which slopes slightly inwardly as it extends upwardly (that is the longitudinal span across the top, or outer end, of the backing member is smaller than the longitudinal span across the bottom, or inner end, of the backing member). Thus, each bit leans slightly rearwardly when the rear face thereof is fully engaged with the front face of the backing member. The front and rear faces of the clamping blocks slope oppoistely to the front and rear faces, respectively, of the backing members. Each clamp block has a screw 32 threadedly received therein and in the holder 20. The threads of screw 32 in holder 20 are of opposite hand to the threads thereof in clamp block 31 so that when the screw is turned clockwise as viewed in FIG. 1, the screw 32 descends with respect to holder 20 and the block 31 descends with respect to screw 32. In this manner the triangular bit 27, which has parallel front and rear faces, is wedged against clamping block 28. The front face of each clamping block 31 engages the rear face of backing member 28 for the next forward bit.

Each bit has three side surfaces, each normal to both the front and rear faces of the bit, to define six cutting edges. The side of the bit opposite the apex extends above the holder, and the front edge of this side defines the effective cutting edge. Since the groove flares slightly outwardly, as it extends rearwardly, the successive effective cutting edges are progressively higher with respect to axis A and hence cut successively deeper into the workpiece. The last bit in each groove (indicated by phantom lines in FIG. 2) effects the deepest cut on the workpiece.

The broaching tool 11 has five longitudinal grooves. The bits, backing members, and clamping blocks in one groove are in staggered relation to the corresponding elements in the other grooves to avoid interference between the bolts and screws used to secure the clamping blocks and backing members to the holder. The broaching tool 12 is similar to the broaching tool 11 except that only four instead of five grooves are provided. These grooves are in staggered relation to the grooves of tool 11 to provide a smoother cut in the workpiece 14. Tool 12 effects the same depth of cut as tool 11.

It will be noted that, in the broaching tool of this disclosure, the longitudinal grooves, which are comparatively simple to make, receive all the bits. Individual holes are not machined into the holder to make individual seats. At the same time, the backing member 28, with pin 30 extending therethrough into the holder, provides rigid support of each bit without expensive construction.

What is claimed is:
1. A broaching tool comprising in combination:
   (a) a holder having a plurality of straight longitudinal V-shaped grooves,
   (b) a plurality of triangular bits received in each groove in spaced relation, each bit having an effective cutting edge extending across the groove above the holder,
   (c) and means to clamp the bits in the grooves.
2. A broaching tool comprising in combination:
   (a) a holder having a plurality of straight longitudinal V-shaped grooves extending from the front to the rear of the holder, said grooves flaring slightly outwardly as the grooves extend rearwardly,
   (b) a plurality of triangular bits received in each groove in spaced relation, two edges of each bit seating on the sides of the groove and the other edge of each bit extending across the groove above the holder,
   (c) and means including a backing member for each bit to secure the bits in the grooves.
3. A broaching tool comprising in combination:
   (a) a holder having longitudinal straight grooves with side walls,
   (b) a plurality of cutting bits received in each groove in spaced relation, each cutting bit having a cutting edge extending across the groove and above the walls, and
   (c) a plurality of backing members received in each groove interspersed with the cutting bits, each backing member having a pin extending into the walls on both sides of the groove to support the bit in front of the backing member against the longitudinal rearward thrust exerted on the bit by the cut.
4. A broaching tool comprising in combination:
   (a) a holder having a plurality of straight longitudinal V-shaped grooves with sloping walls,
   (b) a plurality of triangular bits received in each groove in spaced relation, each bit having an effective cutting edge extending across the groove above the holder, and
   (c) a plurality of backing members received in each groove interspersed with the cutting bits, each backing member having a pin extending into the walls on both sides of the groove to support the bit in front of the backing member against the longitudinal rearward thrust exerted on the bit by the cut.
5. A broaching tool for semi-circular cuts comprising in combination:
   (a) a semi-cylindrical holder having a plurality of straight longitudinal V-shaped grooves circumferentially spaced around the holder,
   (b) a plurality of triangular bits received in each groove in spaced relation, each bit having an effective cutting edge extending across the groove above the holder,
   (c) and means including a backing member for each bit to secure the bits in the grooves.
6. A broaching tool for semi-circular cuts comprising in combination:
   (a) a semi-cylindrical holder having longitudinal straight grooves with side walls,
   (b) a plurality of cutting bits received in each groove in spaced relation, each cutting bit having a cutting edge extending across the groove and above the walls thereof,
   (c) a plurality of backing members received in each groove, each backing member behind a cutting bit and having a pin extending into the walls on both sides of the groove to support the bit against the longitudinal rearward thrust exerted on the bit by the cut, and
   (d) a plurality of wedge blocks received in each groove, each wedge block in front of a cutting bit clamp the cutting bit against the backing member.
7. A broaching tool for semi-circular cuts comprising in combination:
   (a) a substantially semi-cylindrical holder having longitudinal straight V-shaped grooves with sloping walls, said grooves circumferentially spaced around the holder,
   (b) a plurality of triangular cutting bits received in each groove in spaced relation, each cutting bit having an effective cutting edge extending across the groove and above the walls thereof,
   (c) a plurality of triangular backing members received in each groove, each backing member behind a cutting and having a pin extending into the walls on both sides of the groove to support the bit against the longitudinal rearward thrust exerted on the bit by the cut, and
   (d) a plurality of triangular wedge blocks received in each groove, each wedge block secured to the holder between a cutting bit and the next forward backing member to clamp each cutting bit against the backing member behind said cutting bit.
8. A broaching tool for semi-circular cuts comprising in combination:
   (a) a semi-cylindrical holder having longitudinal V-shaped grooves circumferentially spaced around the holder, each groove having sloping walls and each groove extending through the holder from the front to the rear thereof and flaring slightly outwardly as the groove extends rearwardly,
   (b) a plurality of triangular cutting bits received in each groove in spaced relation, two edges of each bit seating on the walls of the groove and the other edge of each bit extending across the groove above the holder,
   (c) a plurality of triangular backing members received in each groove, each backing member behind a cutting bit and having a pin extending into the walls on both sides of the groove to support the bit against the longitudinal rearward thrust exerted on the bit by the cut, and
   (d) a plurality of triangular wedge blocks received in each groove, each wedge block secured to the holder between a cutting bit and the next forward backing member to clamp each cutting bit against the backing member behind said cutting bit.

References Cited by the Examiner

UNITED STATES PATENTS

| | | | |
|---|---|---|---|
| 2,585,832 | 2/1952 | Phaneuf | 29—95.1 |
| 2,730,793 | 1/1956 | Anthony et al. | 29—95.1 |
| 2,914,838 | 12/1959 | Robinson | 29—95.1 |

WILLIAM W. DYER, JR., *Primary Examiner.*

H. L. HINSON, *Assistant Examiner.*